United States Patent [19]

Yanagisawa

[11] Patent Number: 5,126,725
[45] Date of Patent: Jun. 30, 1992

[54] FOLDABLE ELECTRONIC APPARATUS HAVING A DISPLAY INCLINABLE RELATIVE TO A KEYBOARD WITH BALANCE STABILIZATION

[75] Inventor: Yutaka Yanagisawa, Oome, Japan
[73] Assignee: Casio Computer Co., Ltd., Tokyo, Japan
[21] Appl. No.: 514,418
[22] Filed: Apr. 25, 1990

[30] Foreign Application Priority Data
May 19, 1989 [JP] Japan .................. 1-124512

[51] Int. Cl.⁵ ............................................ G09G 3/02
[52] U.S. Cl. .................... 340/711; 340/706; 341/22; 364/708; 361/398; 361/399
[58] Field of Search ............ 340/700, 711, 706, 709, 340/710; 364/708; 312/208, 323; 341/22; 235/441, 449, 488, 490, 492, 1 D; 400/691; 361/398, 399, 394, 395, 392

[56] References Cited

U.S. PATENT DOCUMENTS

| | | | |
|---|---|---|---|
| 4,545,023 | 10/1985 | Mizzi | 364/709 |
| 4,711,992 | 12/1987 | Sekine | 361/399 |
| 4,749,875 | 6/1988 | Hara | 364/708 |
| 4,774,399 | 9/1988 | Fujita et al. | 235/441 |
| 4,842,531 | 6/1989 | Takemura | 341/22 |
| 4,961,125 | 10/1990 | Suzuki | 361/398 |

*Primary Examiner*—Alvin E. Oberley
*Assistant Examiner*—Chanh Nguyen
*Attorney, Agent, or Firm*—Frishauf, Holtz, Goodman & Woodward

[57] ABSTRACT

A small electronic apparatus employs a first case for storing a display panel and a second case for storing a keyboard which are foldably coupled to each other. The apparatus also includes an inclination mechanism for retaining the first case at an inclined plane with respect to the second case to see the display panel clearly. The first case is provided with a memory card insertion case, a metal plate, and a membrane of the keyboard. A plurality of openings are formed in an upper portion of the card insertion case. Openings are respectively positioned at upper portions of electronic parts disposed in the case to reduce the thickness of the apparatus. The metal plate is disposed on the upper portion of the card insertion case for reinforcing it. With a thin construction, the apparatus keeps the balance on a desk, even if the first case is inclined to an outward plane of the second case.

6 Claims, 6 Drawing Sheets

FOLDABLE ELECTRONIC APPARATUS HAVING A DISPLAY INCLINABLE RELATIVE TO A KEYBOARD WITH BALANCE STABILIZATION

BACKGROUND OF THE INVENTION

1. Field of the Invention

The present invention relates to a thin structure of a compact electronic device wherein a display casing is arranged at an angle to a key-input casing.

2. Description of the Related Art

A conventional compact electronic calculating device of a so-called folding type comprises a key-input casing having a key input section for inputting calculation data or the like, and a display casing having a display section for displaying the calculation data input from the key input section and the results of arithmetic operations. The display casing is openably connected to the key input casing.

In such a conventional device, if the display section having a display panel such as a liquid crystal display panel is arranged on the same plane as the key input section, it would sometimes be difficult to see displayed data owing to adverse affection of light. In order to avoid this undesirable situation, a display casing 72 can be arranged at an angle to a key input casing 71, as shown in FIG. 8.

In this type of conventional calculating device, the key input casing 71 comprises a lower casing 73 and an upper casing 74 formed on the lower casing 73. A circuit board (not shown) is provided in the lower casing 73. A key input section (not shown) is formed in an upper part of the upper casing 74, and a memory card storing section (not shown) is formed in a lower part of the upper casing 74. A replaceable memory (RAM) card 75 is inserted into the memory card storing section.

In the conventional device, the memory card storing section is formed in the lower surface of the upper casing 74. As a matter of course, compared to the case where such a memory card storing section is not provided, the thickness of the key input casing 71 increases and, accordingly, the thickness of the device increases.

In this case, if the thickness of the casing 71 is reduced, the strength of the casing lowers and the casing is easily deformed. Consequently, when the keys of the key input section formed in the upper part of the upper casing 74 are depressed, the upper casing 74 is deformed and it is troublesome for the operator to operate the key input section.

Suppose that this conventional device is used in the state wherein the device is placed on a desk 76 and the display casing 72 is arranged at an angle to the key input casing 71, as shown in FIG. 8. If the operator lifts his hands off the key input casing 71, the key input casing 71 tilts up owing to the weight of the display casing 72, as shown in FIG. 9, and the operation of the device becomes troublesome.

SUMMARY OF THE INVENTION

The present invention has been made in consideration of the above circumstances, and its object is to provide a compact electronic apparatus having a small thickness and being able to keep the balance even if a display case is inclined.

An electronic apparatus according to the present invention comprises:

a key input casing for storing a keyboard and having a card receiving space for storing a memory card to be inserted therein, the key input casing including an enclosure for enclosing the memory card from all sides except one side;

a keyboard in the key input casing;

a connector disposed in the memory card receiving space for electrically connecting the memory card with an electronic part stored in the key input casing, the enclosure of the key input casing including a cavity in which an opening is formed, at least a portion of the connector being in the opening;

a thin reinforcing plate, also serving as a weight member, mounted on the cavity of the enclosure to cover the opening and for reinforcing the one side of the enclosure;

a display casing for storing a display panel and having a size covering substantially all the surface of the key input casing; and a coupling means for hingedly coupling the display casing with the key input casing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention, in which the invention is applied to a compact electronic calculating device of a so-called folding type, will now be described with reference to FIGS. 1 to 7.

Figure 2:
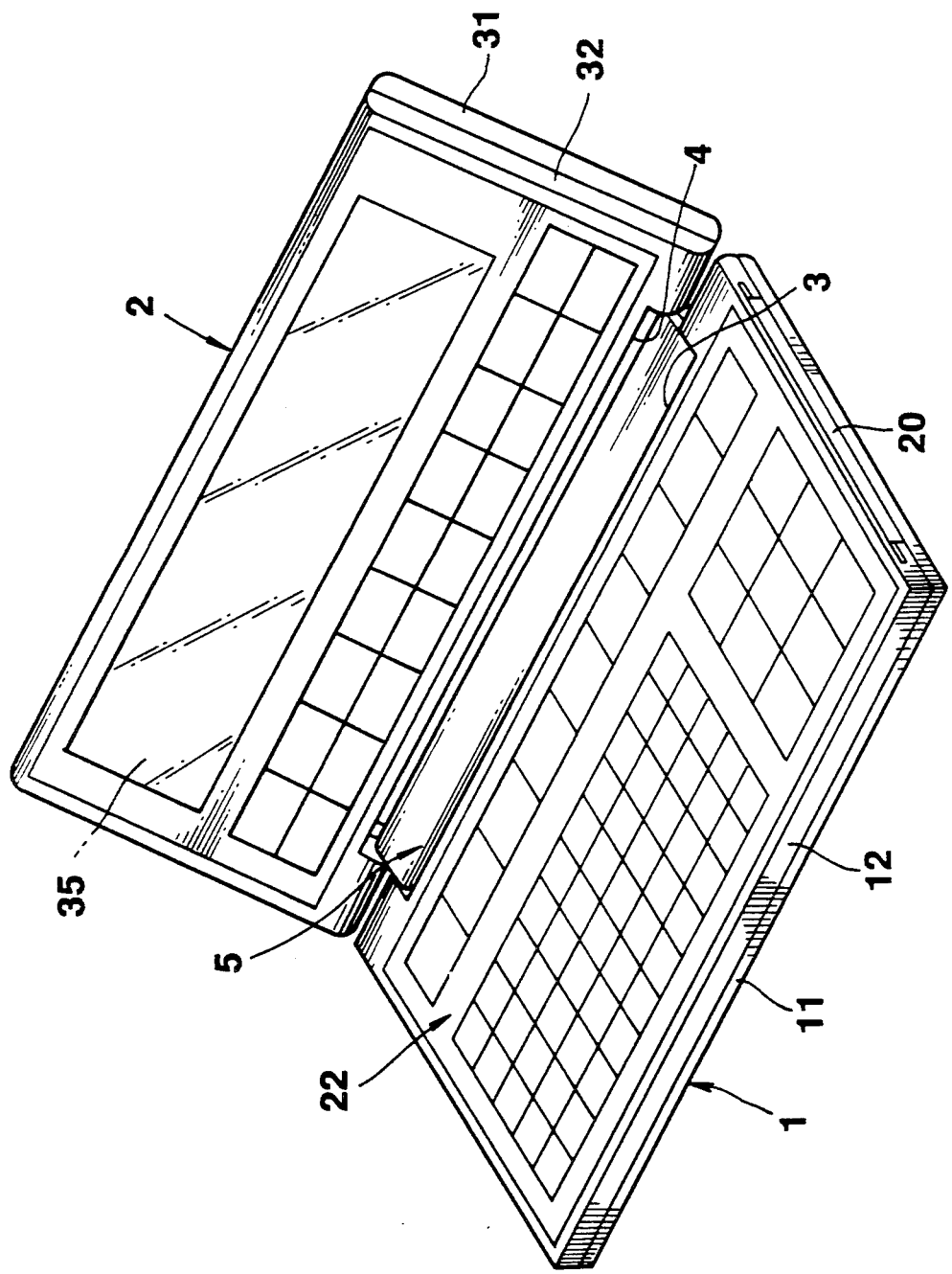
FIG. 2 is a perspective view showing an external appearance of the compact electronic calculating device shown in FIG. 1.

FIG. 2 shows an external appearance of the compact electronic calculating device.

This device comprises a key input casing 1 and a display casing 2. A long and wide hinge member 5 is arranged in hinge containing sections formed in the connecting sections of the key input casing 1 and the display casing 2. As will be described later, the casings 1 and 2 are rotatable in relation to the hinge member 5 about different fixed axes.

Figure 1:
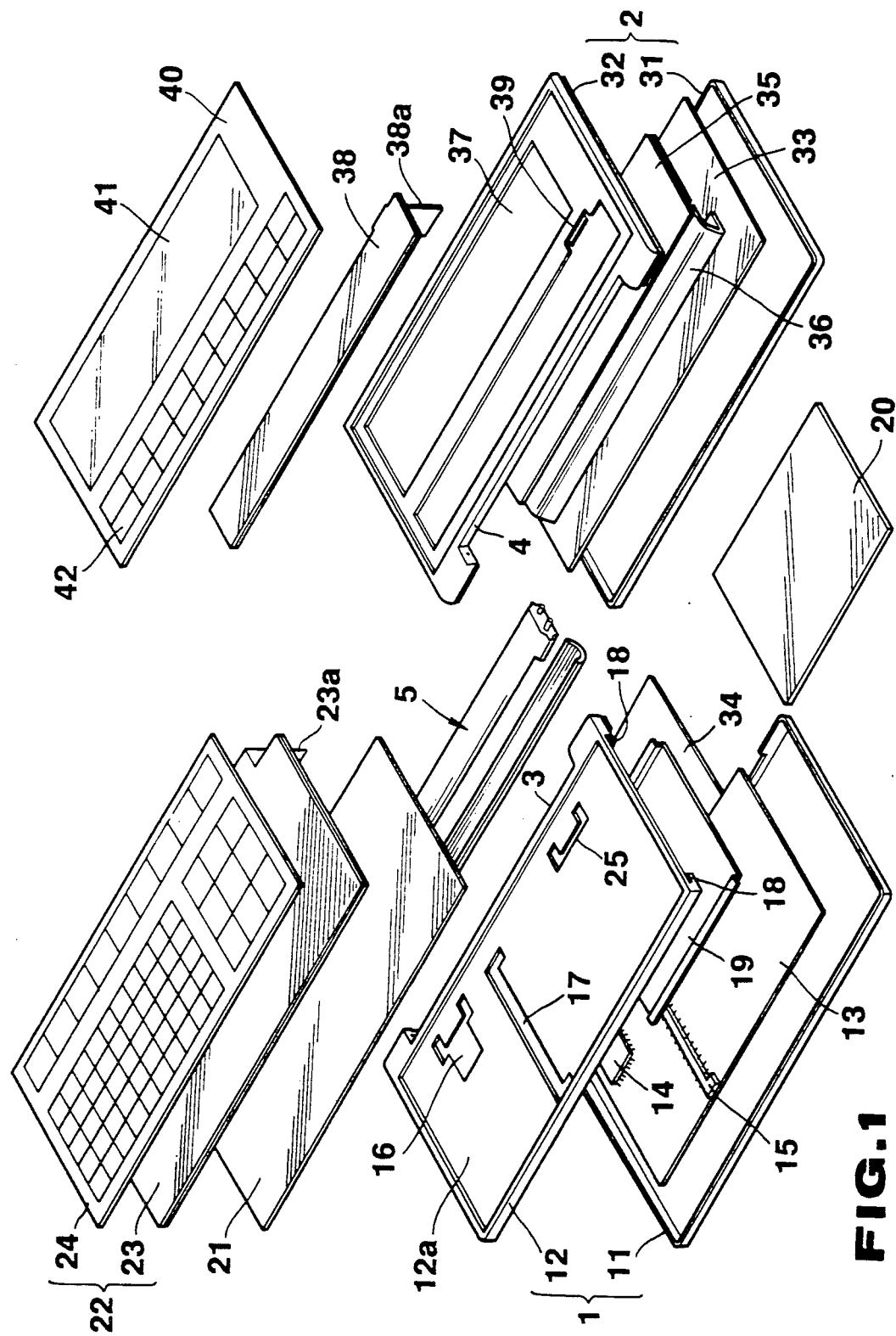
FIG. 1 is an exploded perspective view showing an overall structure of a compact electronic calculating device of the present invention.

FIG. 1 is an exploded perspective view of the compact electronic calculating device.

A key input casing 1 comprises a lower casing 1 and a memory card holding casing 12. A circuit board 13 is arranged within the lower casing 11. An IC unit 14, a male pin connector 15, etc., which constitute an electronic circuit section of the calculating device, are mounted on the circuit board 13. In order to thin the key input casing 1, the memory card holding casing 12 has a hole 16 for the insertion of the IC unit 14 and a hole 17 for the insertion of the pin connector 15. A memory card guide plate 19 made of stainless steel is attached to a fixing section 18 provided on the right half portion (in the figure) of the lower surface of the memory card support casing 12. A memory card 20 is detachably inserted between the memory card guide plate 19 and the memory card holding casing 12. A female type pin connector (not shown) provided at an end face of the memory card 20 is connected to the male type pin connector 15.

A cavity 12a is formed in the upper surface of the memory card holding casing 12, and a stainless steel reinforcement plate 21 and a key input section 22 are laminated, in this order, in the cavity 12. The key-input section 22 is designed to input predetermined data. The key input section 22 comprises a sheet shaped key unit 23 and a key sheet 24. The key unit 23 is formed by laminating a fixed contact sheet, a spacer, and a movable contact sheet, with the fixed contact sheet being the bottom. The key sheet 24 is arranged on the upper surface of the sheet type key unit 23. A portion 23a of the key unit 23 extends downward, beyond the reinforcement plate 21, of an insertion hole 25 formed in the memory card holding casing 12, and the portion 23a is electrically connected to the circuit board 13.

A display casing 2 comprises a lower casing 31 and an upper casing 32. A circuit board 33 is arranged within the lower casing 31. As will be described later, the circuit board 33 is electrically connected to the circuit board 13 of the key input casing 1 via a flexible film 34. A liquid crystal display panel 35 is provided on the upper surface of the circuit board 33. The liquid crystal display panel 35 is electrically connected to the circuit board 33 via a flexible film 36. A display window 37 is formed in one part of the upper casing 32, which corresponds to the liquid crystal display panel 35. A sheet shaped key unit 38, having a structure similar to that of the sheet shaped key unit 23 of the key input section 22, is arranged on the other part of the upper surface of the upper casing 32, where the display window 37 is not provided. A portion 38a of the sheet shaped key unit 38 is electrically connected to the circuit board 33 through an insertion hole 39 formed in the upper casing 32. A decorative sheet 40 is provided on the key unit 38 and the upper casing 32. The decorative sheet 40 has a transparent portion 41 in its area corresponding to the display window 37, and also has a key sheet portion 42 in its area corresponding to the sheet shaped key unit 38.

Figure 3:
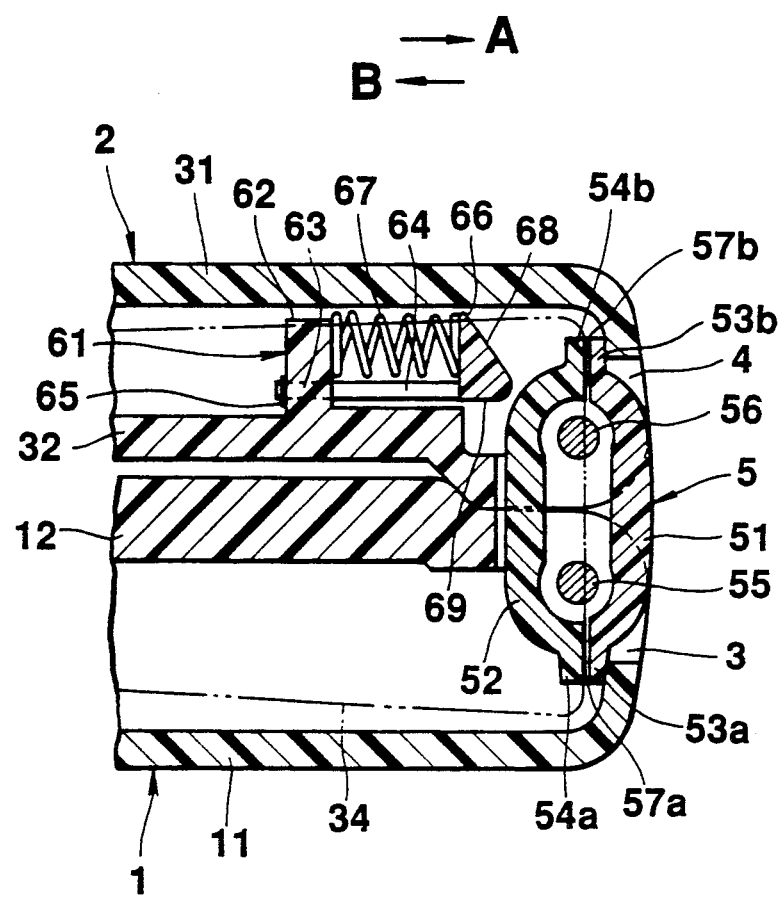
FIG. 3 is a vertical cross-sectional side view of an main portion of the device shown in FIG. 2, in the state wherein a display casing is closed in relationship to a key input casing.

FIG. 3 shows a region of the hinge member 5 of the compact electronic calculating device.

The hinge member 5 comprises an outer hinge portion 51 and an inner hinge portion 52, which have substantially symmetrical shapes. The hinge portions 51 and 52 have flanges 53a, 53b, 54a and 54b at the end portions in their transverse direction. A pair of mutually facing flanges 53a and 54a and a pair of mutually facing flanges 53b and 54b are coupled by means of screws (not shown). The outer and inner hinge portions 51 and 52 have, as one body, a substantially oval cross section. A part of the coupled hinge portions 51 and 52, which is close to the flanges 53a and 54a, is arranged within a hinge containing section 3 of the key input casing 1 (hereinafter, this part is referred to as "first part of the hinge member 5"). The first part of the hinge member 5 is rotatable in relation to the key input casing 1 via pins 55 which are provided at both ends of the first part in its longitudinal direction. The other part of the coupled hinge portions 51 and 52, which is close to the flanges 53b and 54b, is arranged within a hinge containing section 4 of the display casing 2 (hereinafter, this part is referred to as "second part of the hinge member 5"). The second part of the hinge member 5 is rotatable in relation to the display casing 2 via pins 56 which are provided at both ends of the second part in its longitudinal direction. In other words, the key input casing 1 and the display casing 2 are rotatable in relation to the hinge member 5 about different axes, i.e. pins 55 and 56.

Recesses 57a and 57b, extending over a predetermined range, are formed in the inner faces of the flanges 53a and 53b of outer hinge portion 51. The aforementioned flexible film 34 is inserted through the recesses 57a and 57b. Namely, the flexible film 34 is connected at one end to the circuit board 13 of the key input casing 1, and at the other end to the circuit board 33 of the display casing 2. An intermediate portion of the flexible film 34 extends between the hinge portions 51 and 52 through the recesses 57a and 57b.

An urging mechanism 61 is arranged within the display casing 2 in the vicinity of the hinge containing section 4. The urging mechanism 61 has a pin 64, which is slidable in the directions of arrows A and B, is inserted into a pin insertion hole 63 formed in a proximal end portion of a projection 62 mounted on the inner surface of upper casing 32 of display casing 2. The pin 64 has at one end an annular stopper 65, and at the other end a substantially triangular cam member 66. A compressed coil spring 67 is provided between the cam member 66 and the projection 62. The cam member 66, along with the pin 64, is urged in the direction of arrow A by means of the compressed coil spring 67. In the normal state, the cam member 66 is positioned such that the stopper 65 abuts on the projection 62. As will be described later, the cam member 66 has a flat cam surface 68, which is to be engaged with the flange 54 of inner hinge portion 52, and an arcuated cam surface 69 continuous with the flat cam surface 68.

The opening/closing operation of the display casing 2 of the compact electronic calculating device will now be described.

FIG. 3 shows the state wherein the device is closed (i.e. the display casing 2 is folded down onto the lower casing 1). In this state, the display casing 2 is superposed on the key input casing 1, the hinge portions are inclined substantially vertically, and the cam member 66 takes a normal position.

Figure 4:
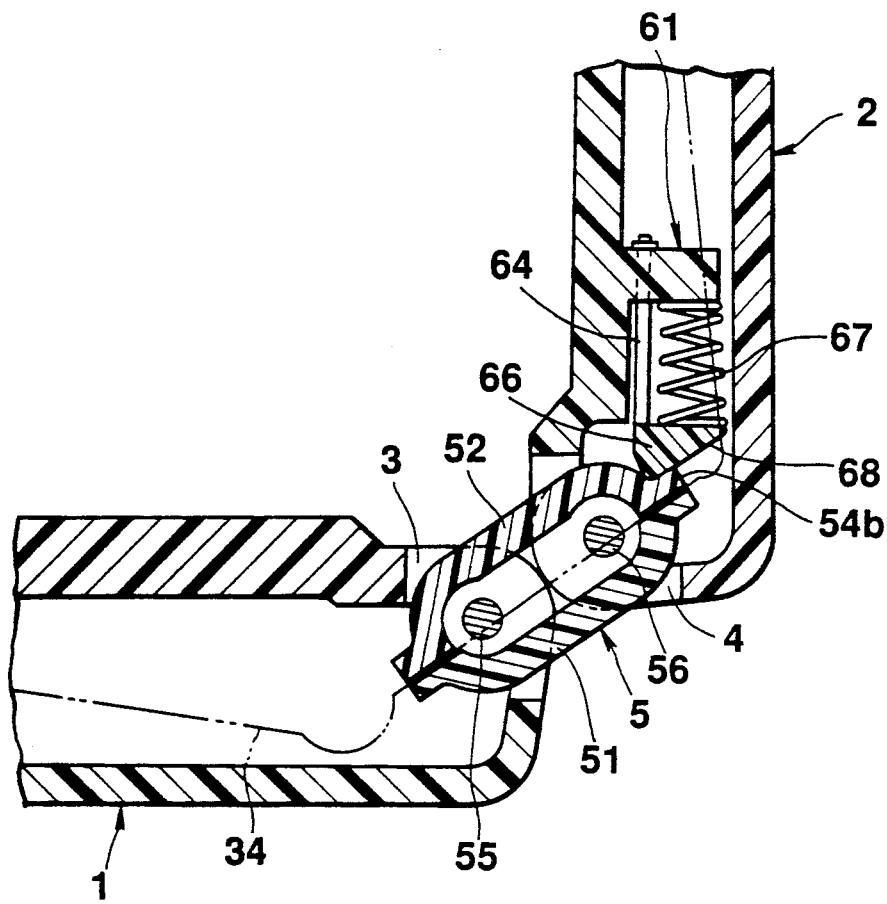
FIG. 4 is a vertical cross-sectional side view of the main portion of the device shown in FIG. 2, in the state wherein the display casing is opened about 90° in relationship to the key input casing.

When the display casing 2 is unfolded in relation to the key input casing 1, the display casing 2 rotates about the pins 56. When the display casing 2 rotates about the pins 56 by approximately 45°, as shown in FIG. 4, the cam surface 68 of the cam member 66, which moves along with the display casing 2, abuts on the flange 54b of the inner hinge portion 52. The hinge portions 51 and 52 and the key input casing 1 rotate about the pins 55 relative to each other; thus, the angle of the display casing 2 in relation to the key input casing 1 is about 90°, as shown in FIG. 4. In this state, the cam surface 68 of the cam member 66 is only in contact with the flange 54b of the inner hinge portion 52, and no urging force is applied to the display casing 2.

Figure 5:
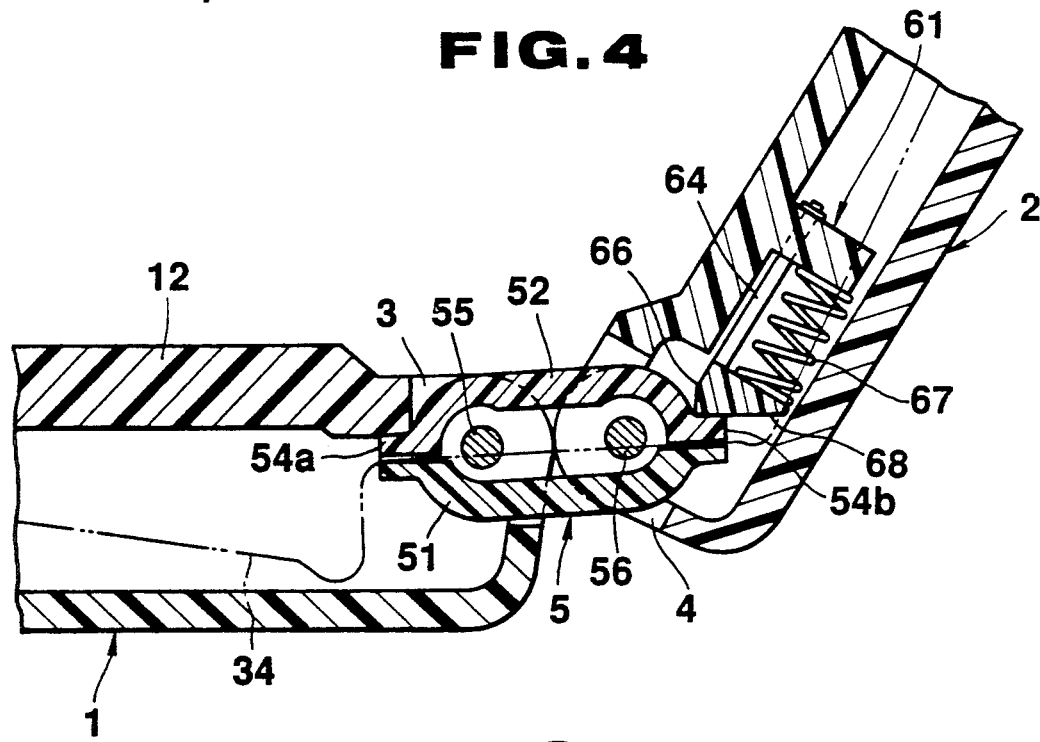
FIG. 5 is a vertical cross-sectional side view of the main portion of the device shown in FIG. 2, in the state wherein the display casing is opened a little more than 90° in relationship to the key input casing.

When the device is further opened, as shown in FIG. 5, the coupled hinge portions 51 and 52 further rotate about the pins 55 since the flange 54 of the inner hinge portion 52 abuts on the cam surface 68 of the cam member 66. Then, the flange 54a of the inner hinge portion 52 abuts on that part of the inner surface of the key input casing 1, which is close to the hinge containing section 4 of the memory card holding casing 12. In this state, the cam surface 68 of the cam member 66 is put in contact with the flange 54b of the inner hinge portion 52, and simultaneously the flange 54a of the inner hinge portion 52 abuts on the inner surface of the memory card holding casing 12 of the key input casing 1; therefore, the rotation of the coupled hinge portions 51 and 52 is prevented temporarily. In other words, even if the operator lifts his hands off the display casing 2, the display casing 2 is kept in the position shown in FIG. 5, i.e. at an angle slightly greater than 90° in relation to the key input casing 1.

Figure 6:
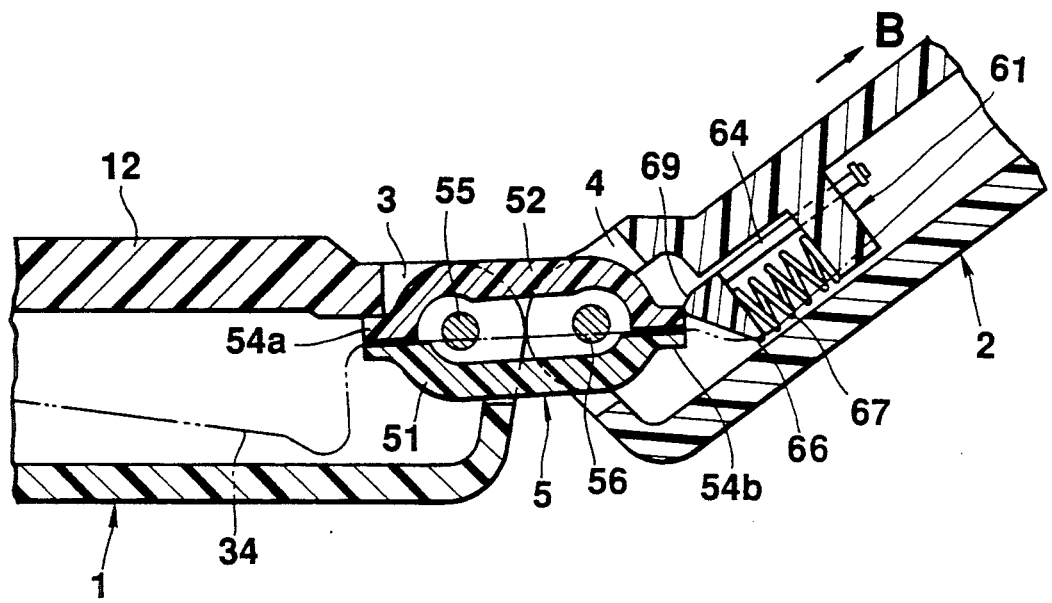
FIG. 6 is a vertical cross-sectional side view of the main portion of the device shown in FIG. 2, in the state wherein the display casing is further opened in relationship to the key input casing, from the state shown in FIG. 5.

When the device is further opened, as shown in FIG. 6, the cam surface 69 of the cam member 66 is first pressed on the end face of the flange 54b of inner hinge portion 52 and subsequently on the end face of the flange 53b of outer hinge portion 51. Accordingly, the cam member 66 moves along with the pin 64 in the direction of arrow B against the force of the compressed coil spring 67. In this case, since the display casing 2 is unfolded against the force of the compressed coil spring 67, a load of a suitable degree acts against the rotation of the display casing 2.

Figure 7:
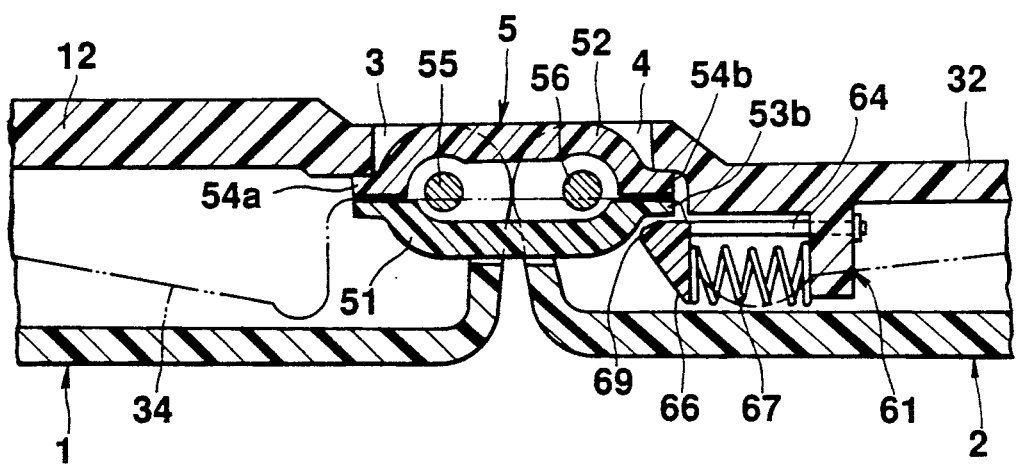
FIG. 7 is a vertical cross-sectional side view of the main portion of the device shown in FIG. 2, in the state wherein the display casing is opened about 180° in relationship to the key input casing.
Figure 8:
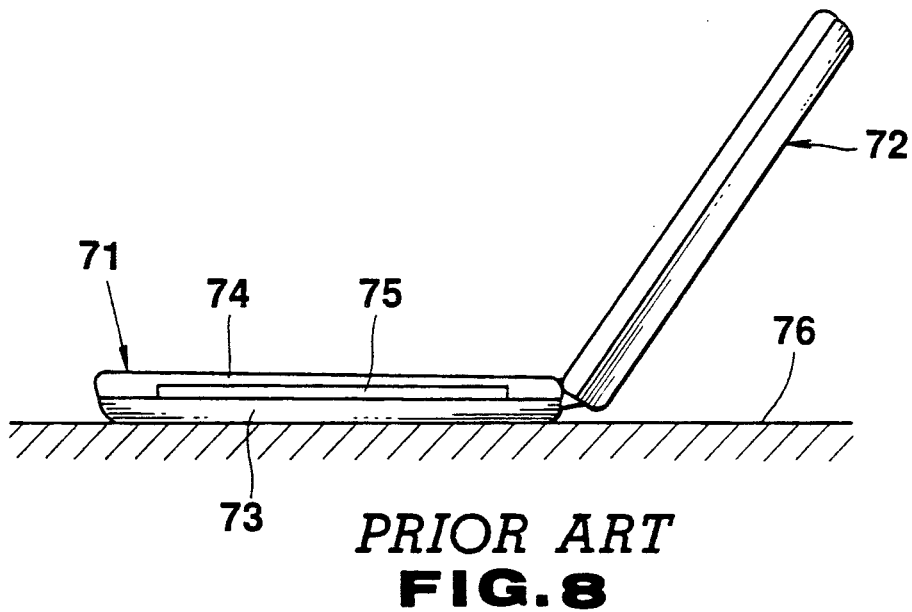
FIG. 8 is a side view showing an example of a conventional compact electronic calculating device.
Figure 9:
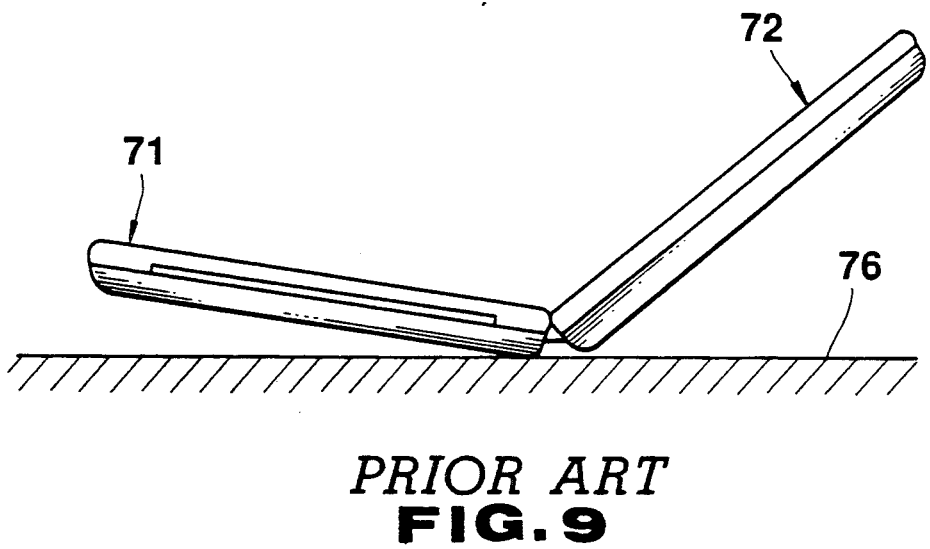
FIG. 9 is a side view of an external appearance of the device shown in FIG. 8, for explaining a problem of this device.

When the display casing 2 is further rotated at a greater angle in relation to the key input casing 1, as shown in FIG. 7, the cam surface 69 of the cam member 66 is disengaged from the end faces of the flanges 54b and 53b of hinge portions 51 and 52. Consequently, the cam member 66, along with the pin 64, is restored to its normal position by virtue of the force of the compressed coil spring 67. In addition, that part of the inner surface of the upper casing 32 of display casing 2, which is close to the hinge containing section 4, abuts on the flange 54b of inner hinge portion 52, whereby further rotation of the display casing 2 is prevented. furthermore, since the cam member 66, which has been restored to the normal position, faces the flange 53b of the outer hinge portion 51, the rotation of the display casing 2 in the reverse direction (i.e. the direction in which the device is closed) is temporarily prevented. Thus, in this state, the display casing 2 is retained at a maximum angle, i.e. 180°, in relation to the key inupt casing 1.

By contrast, the display casing 2, in the position shown in FIG. 5, ca be folded towards the key input casing 1 with a relatively weak force, since the flange 54a of inner hinge portion 52 simply contacts with the inner surface of the memory card holding casing 12 of key input casing 1, and the cam surface 68 of cam member 66 simply contacts with the flange 54b of inner hinge portion 52.

When the display casing 2 is rotated towards the key input casing 1 from the state shown in FIG. 6 to the state shown in FIG. 5, a relatively large force is required in the initial stage of rotation. In this case, the cam surface 69 of cam member 66 is pressed on the end face of the flange 54b of inner hinge portion 52, and the cam member 66 is moved to some degree in the direction of arrow B against the force of the compressed coil spring 67. Thus, a load of a suitable degree acts against the rotation of the display casing 2.

On the other hand, when the display casing 2 is rotated towards the key input casing 1 from the state shown in FIG. 7 to the state shown in FIG. 6, a still larger force is required in the initial stage of rotation, compared to the case where the display casing 2 is rotated from the state shown in FIG. 6. When a relatively large force is applied in order to fold the display casing 2 upwards, the flange 53b of outer hinge portion 51 pushes the cam surface 69 of cam member 66, and subsequently the cam member 66 compresses the coil spring 67 in the direction of arrow B.

As stated above, according to the compact calculating device, when the display casing 2 is positioned at an angle slightly greater than 90° in relation to the key input casing 1, as shown in FIG. 5, the display casing 2 can be retained in this position. Namely, the display casing 2 can be retained in the position as shown in FIG. 2. On the other hand, once the display casing 2 is opened to a maximum degree, as shown in FIG. 7, the rotation of the display casing 2 is restricted in either direction.

In this compact calculating device, even if the memory card holding casing 12 is formed as thin as possible, the strength of the holding casing 12 can be maintained by the stainless steel reinforcement plate 21. Thus, when the key input section 22 is depressed, the memory card holding casing 12 is not bent, enabling the key input section 22 to be exactly operated. In addition, since the stainless steel reinforcement plate 21 can serve as a weight, the key input casing 1 does not lift even if the operator raises his hands off the key input casing 1, for example, when the device is used on the desk. Thus, the key input section 22 is exactly operated. The stainless steel reinforcement plate 21 may be very thin. The memory card holding casing 12 may be formed as thin as possible. In addition, since the memory card holding casing 12 has the holes 16 and 17 for insertion of the electronic parts such as IC unit 14 and male type pin connector 15, the thickness of the key input casing 1 can be reduced.

The above embodiment is directed to the case where the invention has been applied to he "folding-type" electronic calculating device; however, this invention is widely applicable to electronic devices with openable casings.

Additional advantages and modifications will readily occur to those skilled in the art. Therefore, the invention in its broader aspects is not limited to the specific details, and representative device shown and described herein. Accordingly, various modifications may by without departing from the spirit or scope of the general inventive concept as defined by the appended claims and their equivalents.

What is claimed is:

1. A foldable electronic apparatus comprising:

key input case means for storing a keyboard therein, and said key input case means having a card receiving space for receiving and storing a memory card to be inserted therein, said key input case means including an enclosure for enclosing a received memory card from all sides except one side of the memory card;

a keyboard in said key input case means;

a connector disposed in said memory card receiving space for electrically connecting said received memory card with an electronic part stored in said key input case means, said enclosure of said key input case means including a cavity in which an opening is formed, at least a portion of said connector being in said opening;

a weight member comprising a thin reinforcing plate mounted on the cavity of said enclosure, so as to cover said opening, for reinforcing said cavity of said enclosure and for serving as a weight for maintaining said key input case means in a substantially horizontal operative position;

display case means for storing a display panel and having a size covering substantially a complete surface of said key input case means; and coupling means for hingedly coupling said display case means with said key input case means and for retaining said display case means in position at an inclined plane which is adjustable to any angle between 90° and 180° relative to said key input case means, whereby said key input case means is maintained in said substantially horizontal operative position and keeps a balance even at said inclined plane position of said display case means relative to said key input case means, without any external applied force.

2. The apparatus according to claim 1, wherein said key input case means includes a lower case and a support case for forming said cavity of said enclosure and having said opening formed therein.

3. The apparatus according to claim 2, wherein said thin reinforcing plate includes a metal plate.

4. The apparatus according to claim 2, wherein said electronic part is disposed in a space between said lower case and said support case, and another opening is formed in said support case for storing a portion of said electronic part.

5. The apparatus according to claim 4, wherein said thin reinforcing plate has a size for covering substantially all the surface of said support case.

6. An electronic apparatus comprising:

input panel means having means for inputting data, said input panel means including:

a support case having a cavity and an opening, a lower case coupled with said support case so as to form a memory card rest space, a connector at least partially disposed in said memory card receiving space, a portion of said connector being in said opening of said support case, a weight member comprising a reinforcing plate mounted on said cavity of said support case for covering substantially an entire surface of said cavity, and a keyboard mounted on said reinforcing plate;

said reinforcing plate serving as a weight for maintaining input panel means and said keyboard in a substantially horizontal operative position;

display panel means for displaying data inputted from said keyboard, and including a display panel and case means for mounting said display panel thereon;

coupling means for foldably coupling said display panel means to said input panel means and for retaining said display panel means in position at an inclined plane which is adjustable to any angle between 90° and 180° relative said input panel means; and flexible connector means for electrically connecting said keyboard with said display panel by way of said coupling means, whereby said input panel means and said keyboard are maintained in said substantially horizontal operative position and keep a balance even at said inclined plane of said display panel means without any external applied force.

* * * * *

UNITED STATES PATENT AND TRADEMARK OFFICE
CERTIFICATE OF CORRECTION

PATENT NO. : 5,126,725
DATED : June 30, 1992
INVENTOR(S) : Y. YANAGISAWA

It is certified that error appears in the above-identified patent and that said Letters Patent is hereby corrected as shown below:

Title page, Section [56] References Cited, right column (last reference):

Replace U.S. patent "4,961,12<u>5</u>" with --4,961,12<u>6</u>--.

Signed and Sealed this

Fourteenth Day of September, 1993

Attest:

BRUCE LEHMAN

Attesting Officer     Commissioner of Patents and Trademarks